US011330236B2

(12) United States Patent
Kinoshita

(10) Patent No.: US 11,330,236 B2
(45) Date of Patent: May 10, 2022

(54) PROJECTOR CONTROLLING METHOD AND PROJECTOR

(71) Applicant: SEIKO EPSON CORPORATION, Tokyo (JP)

(72) Inventor: Shoichi Kinoshita, Beppu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/082,135

(22) Filed: Oct. 28, 2020

(65) Prior Publication Data

US 2021/0127100 A1 Apr. 29, 2021

(30) Foreign Application Priority Data

Oct. 28, 2019 (JP) .............................. JP2019-195073

(51) Int. Cl.
*H04N 9/31* (2006.01)

(52) U.S. Cl.
CPC ......... *H04N 9/3185* (2013.01); *H04N 9/3188* (2013.01); *H04N 9/3191* (2013.01)

(58) Field of Classification Search
CPC .. H04N 9/3185; H04N 9/3188; H04N 9/3191; H04N 9/3194; H04N 9/3141; H04N 9/3179; G01S 17/46; G01S 17/89; G06F 3/0425

See application file for complete search history.

(56) References Cited

U.S. PATENT DOCUMENTS

| 4,948,258 A * | 8/1990 | Caimi ................ G01B 11/2441 |
| | | 356/3.13 |
| 10,572,971 B2 * | 2/2020 | Tamai ..................... G06T 3/005 |
| 2009/0096994 A1 * | 4/2009 | Smits ................... H04N 9/3129 |
| | | 353/30 |
| 2009/0278999 A1 * | 11/2009 | Ofune .................. H04N 9/3185 |
| | | 348/745 |
| 2012/0257173 A1 | 10/2012 | Murayama |
| 2014/0218341 A1 * | 8/2014 | Ichieda ................. G06F 3/0418 |
| | | 345/175 |
| 2016/0054859 A1 * | 2/2016 | Oshima ................. G06F 3/0425 |
| | | 345/175 |
| 2019/0005607 A1 * | 1/2019 | Tamai .................. H04N 9/3194 |
| 2019/0349556 A1 * | 11/2019 | Miyake ............. H04N 21/4223 |
| 2019/0364253 A1 * | 11/2019 | Miyatani ............. H04N 9/3147 |
| 2021/0075953 A1 * | 3/2021 | Ono ...................... G06T 3/4038 |

FOREIGN PATENT DOCUMENTS

| JP | 2004-235947 | 8/2004 |
| JP | 2012-222517 | 11/2012 |

* cited by examiner

*Primary Examiner* — Paulos M Natnael
(74) *Attorney, Agent, or Firm* — Dority & Manning, P.A.

(57) ABSTRACT

A projector controlling method including projecting a pattern image, capturing an image of the pattern image with an image sensor to acquire captured pattern image data, determining based on the captured pattern image data a flat surface range where a flat surface is present within the range over which the pattern image is projected, generating an on-screen-display superimposed image in such a way that the superimposed image is selectively projected within the flat surface range, and projecting the superimposed image.

9 Claims, 6 Drawing Sheets

PROJECTOR CONTROLLING METHOD AND PROJECTOR

The present application is based on, and claims priority from JP Application Serial Number 2019-195073, filed Oct. 28, 2019, the disclosure of which is hereby incorporated by reference herein in its entirety.

BACKGROUND

1. Technical Field

The present disclosure relates to a projector controlling method and a projector.

2. Related Art

JP-A-2012-222517 discloses a technology relating to a projection apparatus that superimposes a user interface screen on an image and projects the superimposed image, and the technology allows calculation of a parameter for correcting the image based on the amount of distortion of the image and determination of the shape of the user interface screen based on the parameter.

When a flat surface that is a projection target is smaller than a predetermined image, the image is parted at the edge of the flat surface, and the visibility of the image is likely to deteriorate.

SUMMARY

A first aspect is directed to a projector controlling method including projecting a pattern image, capturing an image of the pattern image with an image sensor to acquire captured pattern image data, determining based on the captured pattern image data a flat surface range where a flat surface is present within a range over which the pattern image is projected, generating an on-screen-display superimposed image in such a way that the superimposed image is selectively projected within the flat surface range, and projecting the superimposed image.

A second aspect is directed to the first aspect, in which the pattern image may be formed of a plurality of sub-images.

A third aspect is directed to the second aspect, in which whether or not the flat surface is present may be evaluated based on the captured pattern image data for each of a plurality of sub-ranges corresponding to the plurality of sub-images, and when the flat surface is present in each of the sub-ranges adjacent to each other, the sub-ranges adjacent to each other may be determined as the flat surface range.

A fourth aspect is directed to any of the first to third aspects, in which a position and a size of the superimposed image may be determined in accordance with the flat surface range.

A fifth aspect is directed to any of the first to fourth aspects, in which a position and a size of the superimposed image may be determined in such a way that a margin in the flat surface range is minimized.

A sixth aspect is directed to any of the first to fifth aspects, in which an initial image having an initially set position and size may be projected, the image sensor may capture an image of the initial image to acquire captured initial image data, and the pattern image may be projected in accordance with a difference between the initial image and the captured initial image data.

A seventh aspect is directed to a projector including a projection instrument that project an image, an image sensor that captures an image of the projected image to generate captured image data, and a control circuit that controls the projection instrument and the image sensor, and the control circuit causes the projection instrument to project a pattern image and causes the image sensor to capture an image of the pattern image to acquire captured pattern image data, determines based on the captured pattern image data a flat surface range where a flat surface is present within a range over which the pattern image is projected, generates an on-screen-display superimposed image in such a way that the superimposed image is selectively projected within the flat surface range, and causes the projection instrument to project the superimposed image.

DESCRIPTION OF EXEMPLARY EMBODIMENTS

Figure 1:
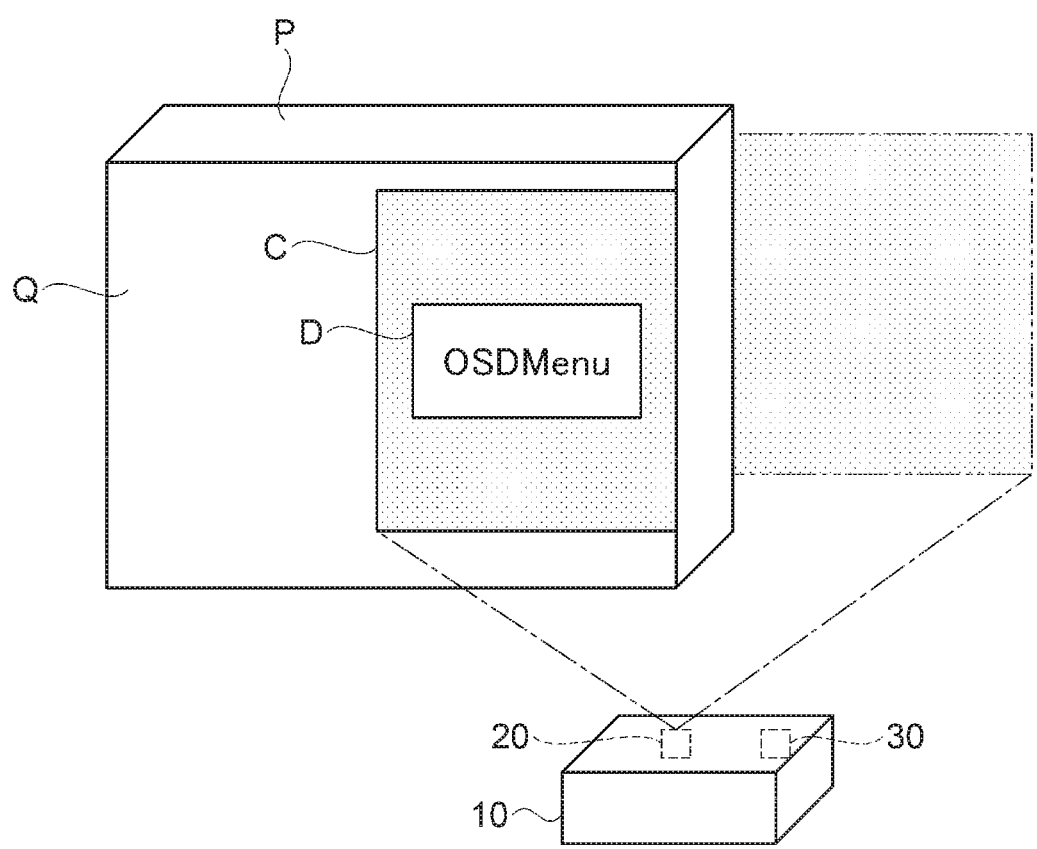
FIG. 1 is a perspective view for describing a projector according to an embodiment.

An embodiment of the present disclosure will be described below with reference to the drawings. In the drawings, the same element or a similar element has the same reference character or a similar reference character, and no redundant description of the same or similar element will be made.

A projector 10 according to the present embodiment is a display apparatus capable of displaying an image C on an object P disposed in front of the projector 10 by projecting light representing the image C forward, as shown in FIG. 1. In the example shown in FIG. 1, the image C contains a superimposed image D formed of an on-screen display (OSD) image. The projector 10 determines the position of the superimposed image D in the image C in such a way that the superimposed image D is selectively projected within a range corresponding to a flat surface Q of the object P.

Figure 2:
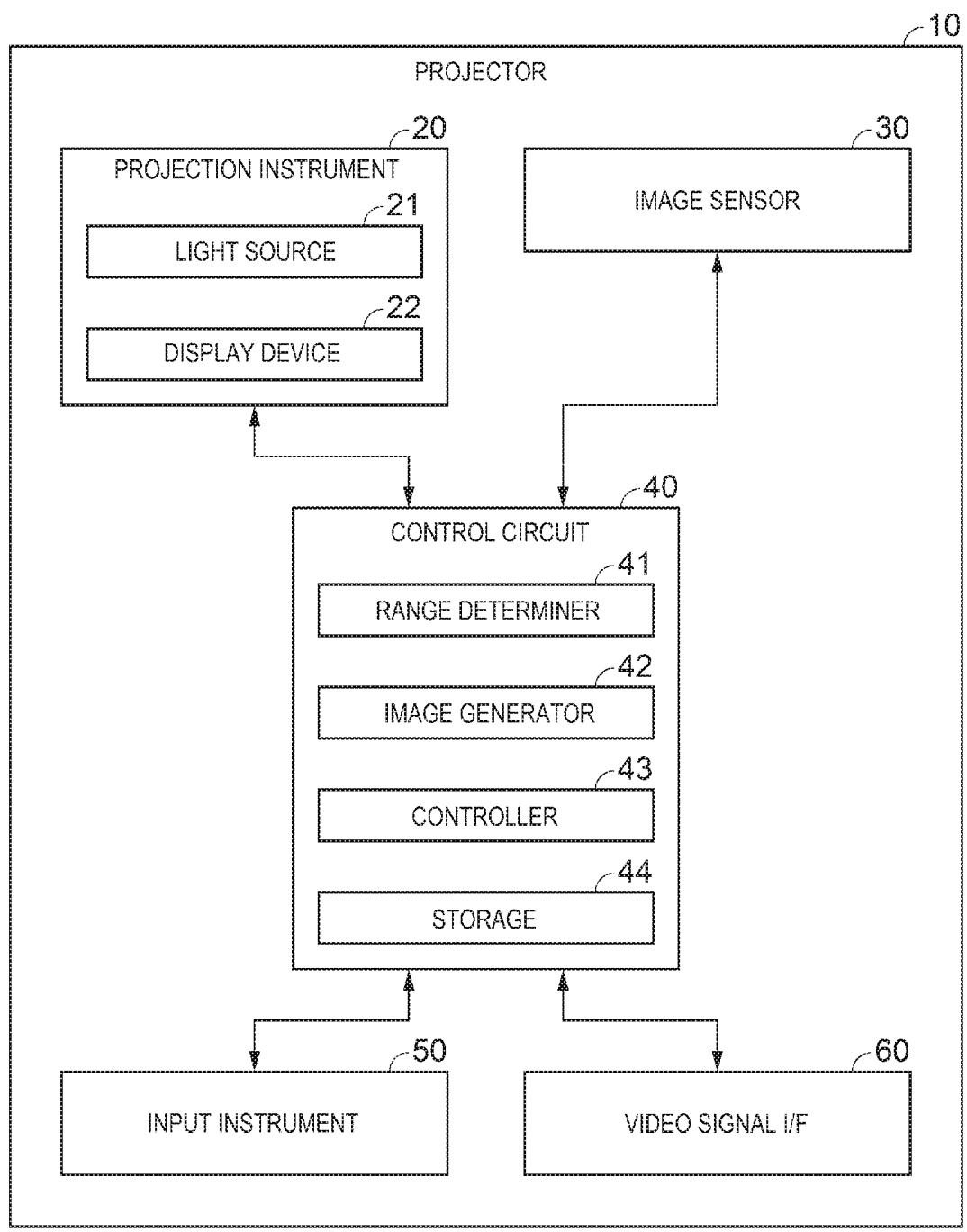
FIG. 2 is a block diagram for describing the configuration of the projector according to the embodiment.

The projector 10 includes a projection instrument 20, an image sensor 30, a control circuit 40, an input instrument 50, and a video signal interface (I/F) 60, as shown in FIG. 2. The projection instrument 20 projects the image C under the control of the control circuit 40. Data representing the image C is provided, for example, in the form of a video signal from an external apparatus that is not shown. The image C may be provided in the form of another recording medium or may be produced by the control circuit 40. The image C can define a projection range over which the projection instrument 20 projects light.

The projection instrument 20 includes a light source 21, such as a discharge lamp and a solid-state light source, and a display device 22, such as a liquid crystal light valve having a plurality of pixels. The projection instrument 20 further includes an optical system that is not shown such as a lens and a mirror. The light emitted from the light source 21 is introduced to the display device 22 via the optical system. The display device 22 modulates the introduced light under the control of the control circuit 40. The projection instrument 20 projects as the image C the light from the display device 22 via the optical system. The method employed by the projection instrument 20 can instead be a method using a mirror device that scans the projection range with the modulated light or a method using a digital micromirror device that controls light reflection on a pixel basis.

The image sensor 30 captures an image of the image C projected by the projection instrument 20 to generate captured image data representing the image C viewed from the image sensor 30 under the control of the control circuit 40. The image sensor 30 includes a solid-state imaging device. The position and orientation of the image sensor 30 in the projector 10 are so adjusted, for example, as to provide a field of view containing the maximum projection range of the projection instrument 20. It is, however, noted that the orientation of the image sensor 30 is adjusted in advance relative to the orientation of the projection instrument 20 in accordance with a predetermined condition. The predetermined condition is, for example, that the control circuit 40 can recognize a missing portion or distortion of the image C projected on the flat surface Q from the captured image data. The image sensor 30 may be disposed outside the enclosure of the projector 10.

The control circuit 40 includes a range determiner 41, an image generator 42, a controller 43, and a storage 44 each in the form of a logical structure. The control circuit 40 includes a processing circuit, for example, a central processing unit (CPU) and a microcontroller. The control circuit 40 forms a computer system that performs computation necessary for the action of the projector 10. The control circuit 40 achieves each function described in the embodiment as well as the range determiner 41, the image generator 42, the controller 43, and the storage 44 by executing a control program installed in advance. The control circuit 40 thus controls each portion of the projector 10. The control circuit 40 may be formed of an integrated hardware section or a plurality of separate hardware sections.

The storage 44 is a computer readable storage medium that stores the control program, a variety of data, and other pieces of information necessary for the action of the control circuit 40. The storage 44 includes, for example, a random access memory (RAM), a read only memory (ROM), a graphic memory, and other semiconductor memories. In addition to the above, the storage 44 may include a nonvolatile auxiliary storage and a volatile primary storage, the latter including a register and a cash memory built in the CPU.

The range determiner 41 determines a flat surface range where the flat surface Q is present out of the projection range over which the projection instrument 20 projects the image C. In detail, the range determiner 41 determines the flat surface range in the projection range based on the captured image data acquired by the image sensor 30. The image generator 42 generates the superimposed image D in such a way that the superimposed image D is selectively projected within the flat surface range determined by range determiner 41. For example, the image generator 42 generates the superimposed image D by changing at least one of the position and size of an OSD initial image having an initially set position and size in the image C. Information on the initial setting can be stored in the storage 44 in advance.

The controller 43 controls operation of driving the projection instrument 20 and the image sensor 30. The controller 43 causes the projection instrument 20 to project, for example, the image C containing the superimposed image D. The controller 43 causes the image sensor 30 to capture an image of the image C projected by the projection instrument 20 to acquire the captured image data. In addition to the above, the controller 43 controls each portion of the projector 10 by carrying out processes necessary for the action of the projector 10.

The input instrument 50 accepts a user's operation and outputs a signal according to the user's operation to the control circuit 40. A variety of input instruments, for example, a push button, a touch sensor, a keyboard, and other switches and a mouse, a touch panel, a digitizer, a distance measuring sensor, and other pointing devices, can be employed as the input instrument 50.

The video signal I/F 60, for example, receives as an input the video signal representing the image C from the external apparatus that is not shown and outputs the video signal to the control circuit 40. The video signal I/F 60 may read the video signal from the recording medium and output the video signal to the control circuit 40. The video signal I/F 60 may include, for example, an antenna that transmits and receives a wireless signal, a receptacle into which a plug of a cable is inserted, a communication circuit that processes the signal transmitted from the external apparatus, and other components.

Figure 3:
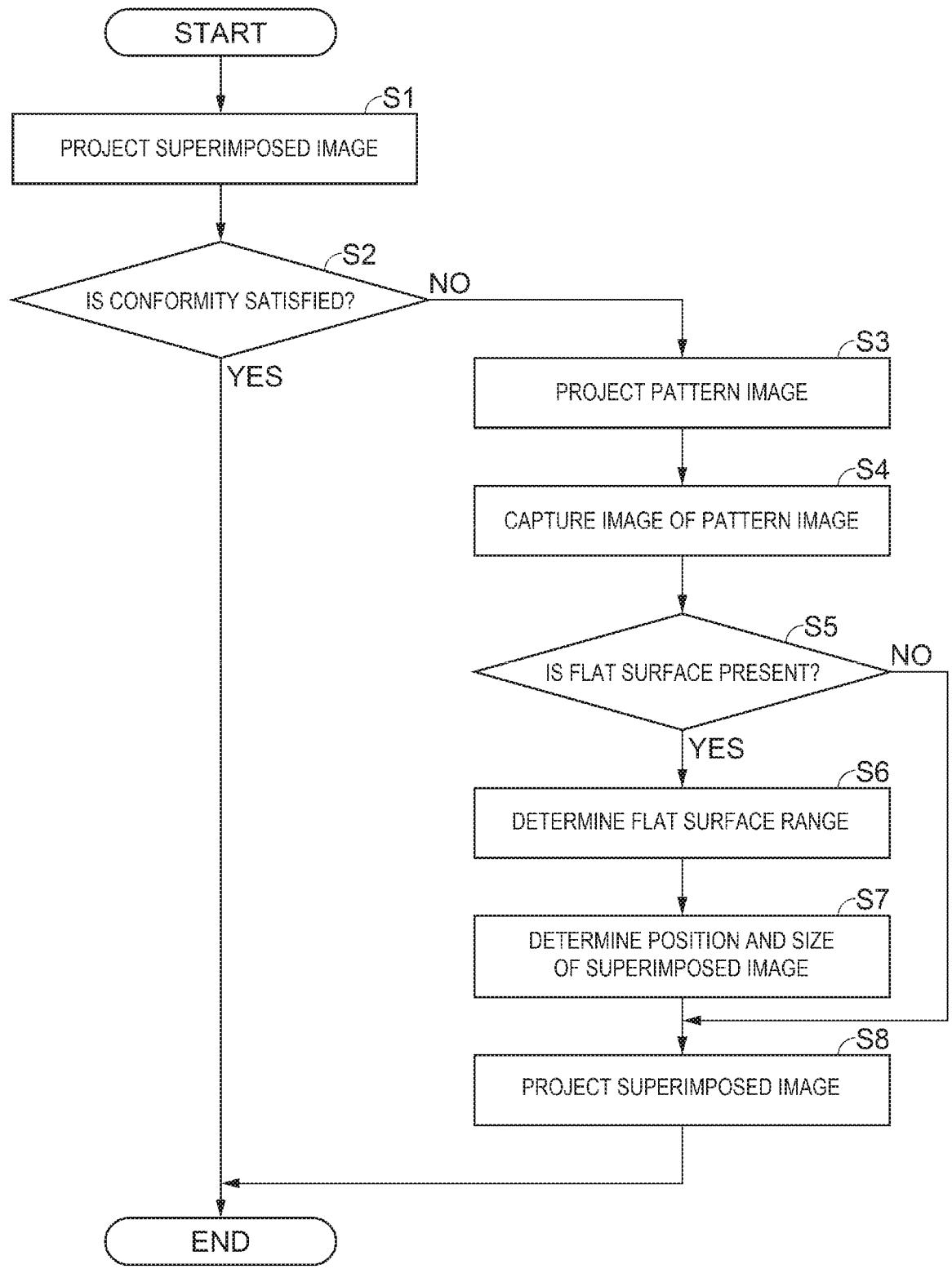
FIG. 3 is a flowchart for describing the action of the projector according to the embodiment.

As a method for controlling the projector 10 according to the present embodiment, an example of the action of the projector 10 according to the control program executed by the control circuit 40 will be described with reference to the flowchart shown in FIG. 3. The series of processes shown in FIG. 3 is initiated, for example, when the input instrument 50 outputs a signal according to the user's operation of instructing the control circuit 40 to start the processes to the control circuit 40. The series of processes may instead be initiated, for example, when the projector 10 is powered on.

Figure 4:
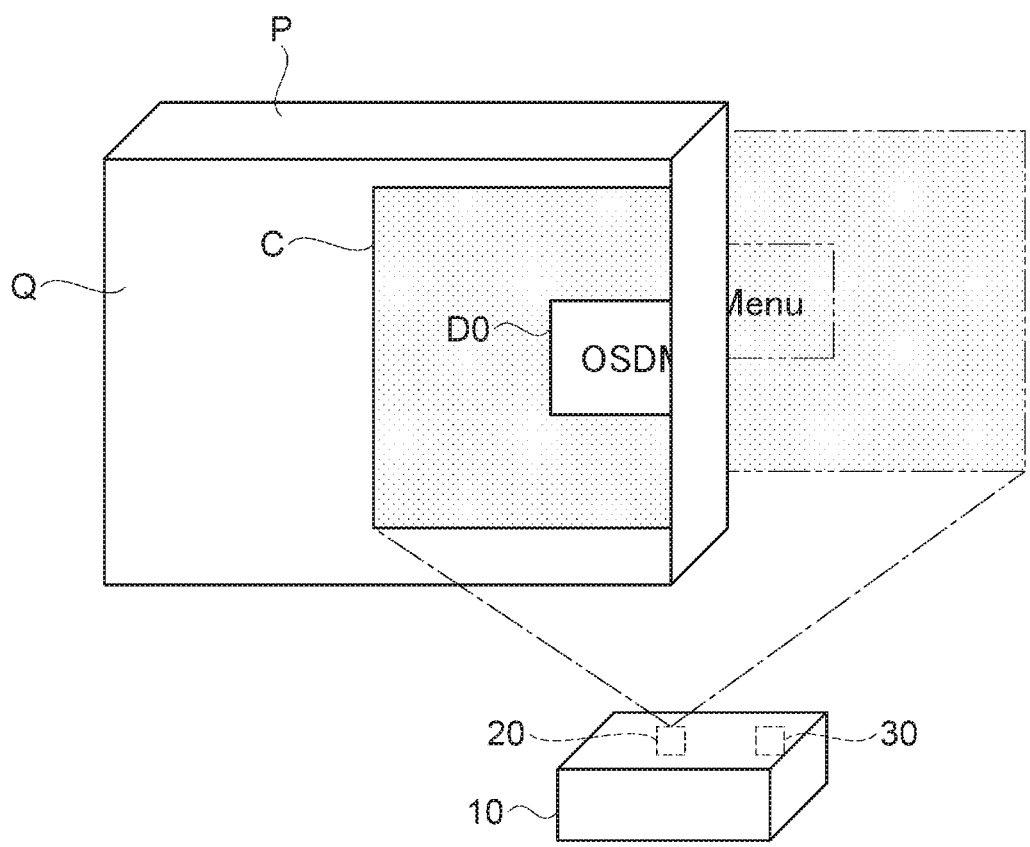
FIG. 4 is a perspective view for describing the projector that projects an initial image.

In step S1, the projection instrument 20 first projects a superimposed image D0 having an initially set position and size as the initial image, as shown in FIG. 4. In detail, the image generator 42 reads data on the superimposed image D0 and the initial setting from the storage 44 and generates the image C containing the superimposed image D0. The controller 43 causes the projection instrument 20 to project the image C generated by the image generator 42, that is, the image C containing the superimposed image D0. In the example shown in FIG. 4, the superimposed image D0 is located at in a central portion of the image C and parted at the edge of the flat surface Q.

In step S2, the range determiner 41 evaluates whether or not an image of the superimposed image D0 captured with the image sensor 30 is determined to satisfy conformity. In detail, the controller 43 first causes the image sensor 30 to capture an image of the superimposed image D0, which is the initial image, to acquire captured initial image data. The range determiner 41 compares the data on the superimposed image D0, which is the initial image, generated by the image generator 42 with the captured initial image data acquired by image sensor 30, and when the degree of the conformity between the two sets of data is greater than a threshold, the image determiner 41 checks the conformity. When the conformity is satisfied, the range determiner 41 terminates the entire process, whereas when the conformity is not satisfied, the range determiner 41 proceeds to the process in step S3.

Figure 5:
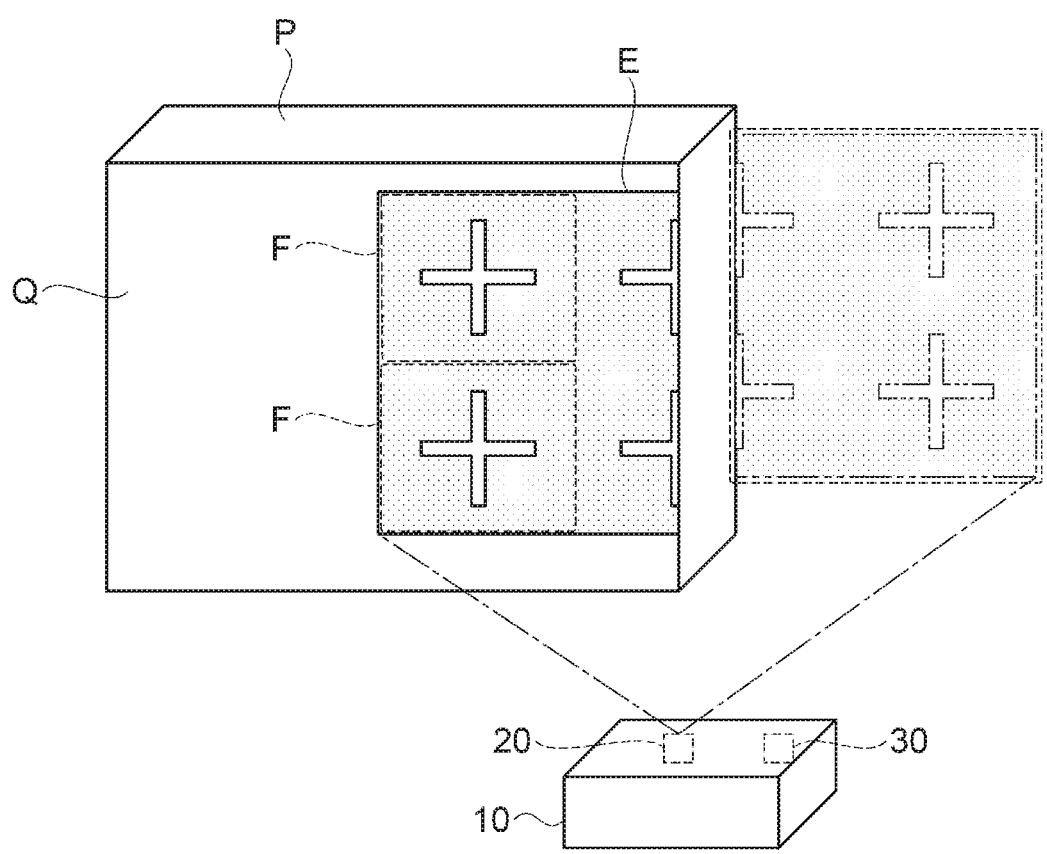
FIG. 5 is a perspective view for describing the projector that projects a pattern image.

In step S3, the projection instrument 20 projects a pattern image E formed of a plurality of sub-images F, as shown in FIG. 5. That is, the projection instrument 20 projects the pattern image E in accordance with the difference between the initial image and the captured initial image data. In detail, the image generator 42 reads data on the pattern image E from the storage 44 and generates the pattern image E used to determine the flat surface range. The controller 43 causes the projection instrument 20 to project the pattern image E generated by the image generator 42. In the example shown in FIG. 5, approximately the left half of the pattern image E formed of six sub-images F arranged in a matrix formed of two rows by three columns in the projection range is projected on the flat surface Q. The pattern image E may instead include another plurality of sub-images F, the number of which is not six. The sub-images F do not necessarily each have the shape of a cross. Further, the pattern image E can be designed in a variety of other forms, such as a lattice-shaped reference lines.

In step S4, the image sensor 30 captures an image of the pattern image E projected by the projection instrument 20 to generate captured pattern image data. That is, the controller 43 causes the image sensor 30 to capture an image of the pattern image E to acquire the captured pattern image data.

In step S5, the range determiner 41 evaluates based on the captured pattern image data acquired in step S4 whether or not the flat surface Q is present within the projection range over which the pattern image E is projected. In detail, the range determiner 41 evaluates based on the data on the pattern image E and the captured pattern image data whether or not the flat surface Q is present for each of a plurality of sub-ranges corresponding to the plurality of sub-images F. That is, the range determiner 41 compares data on each of the sub-images F with the captured pattern image data in the corresponding sub-range and determines that the flat surface Q is present in the corresponding sub-range when the degree of conformity between the two sets of data is greater than a threshold. The degree of the conformity is, for example, a degree that allows the flat surface Q to be expected to be present over one entire sub-range. The range determiner 41 proceeds to the process in step S6 when determining that the flat surface Q is present in at least any of the plurality of sub-ranges, and proceeds to the process in step S8 when determining that the flat surface Q is not present in any of the plurality of sub-ranges.

In step S6, the range determiner 41 determines as the flat surface range the range having been determined in step S5 that the flat surface Q is present. Further, when the same flat surface Q is present in each of a plurality of sub-ranges adjacent to each other, the range determiner 41 determines the plurality of sub-ranges adjacent to each other as the flat surface range. In the example shown in FIG. 5, the two left sub-images F out of the six sub-images F are adjacent to each other, and the same flat surface Q is present in two sub-ranges corresponding to the two sub-images F. The range determiner 41 therefore determines the range of the two left sub-images F adjacent to each other as a continuous one flat surface range.

In step S7, the image generator 42 generates the superimposed image D formed of an OSD image in such a way that the superimposed image D is selectively projected within the flat surface range determined in step S6. For example, the image generator 42 generates the superimposed image D by changing the position of the superimposed image D0, which is the initial image, in the projection range in such a way that the superimposed image D0 is projected within the flat surface range. The image generator 42 thus changes at least one of the position and size of the superimposed image D0 in accordance with the flat surface range to determine the position and size of the superimposed image D. The image generator 42 may instead determine the position and size of the superimposed image D in such a way that the margin in the flat surface range is minimized.

In step S8, the projection instrument 20 projects the superimposed image D generated in step S7 toward the flat surface Q present within the flat surface range. In detail, the controller 43 causes the projection instrument 20 to project the image C containing the superimposed image D having the position and size determined in step S7. The superimposed image D is thus selectively projected within the flat surface range corresponding to the flat surface Q, as shown, for example, in FIG. 1.

As described above, for example, when the position of the OSD image is not appropriate with respect to the flat surface, which is the projection target, and the visibility of the OSD image therefore deteriorates, the projector 10 can project the OSD image within the range in which the flat surface is present. The projector 10 can therefore prevent deterioration of the visibility of the OSD image. In addition to the above, when the user desires to easily operate the projector 10 by referring to a setting screen, for example, when the user makes minimum settings before the projector 10 is correctly installed, the projector 10 can readily project the setting screen as the superimposed image D on the flat surface Q.

The embodiment has been described above, and the present disclosure is not limited to the above description. The configuration of each portion may be replaced with an arbitrary configuration having the same function, and an arbitrary configuration in the embodiment may be omitted or added within the technical scope of the present disclosure. The disclosure of the embodiment thus allows a person skilled in the art to conceive of alternate embodiments.

Figure 6:
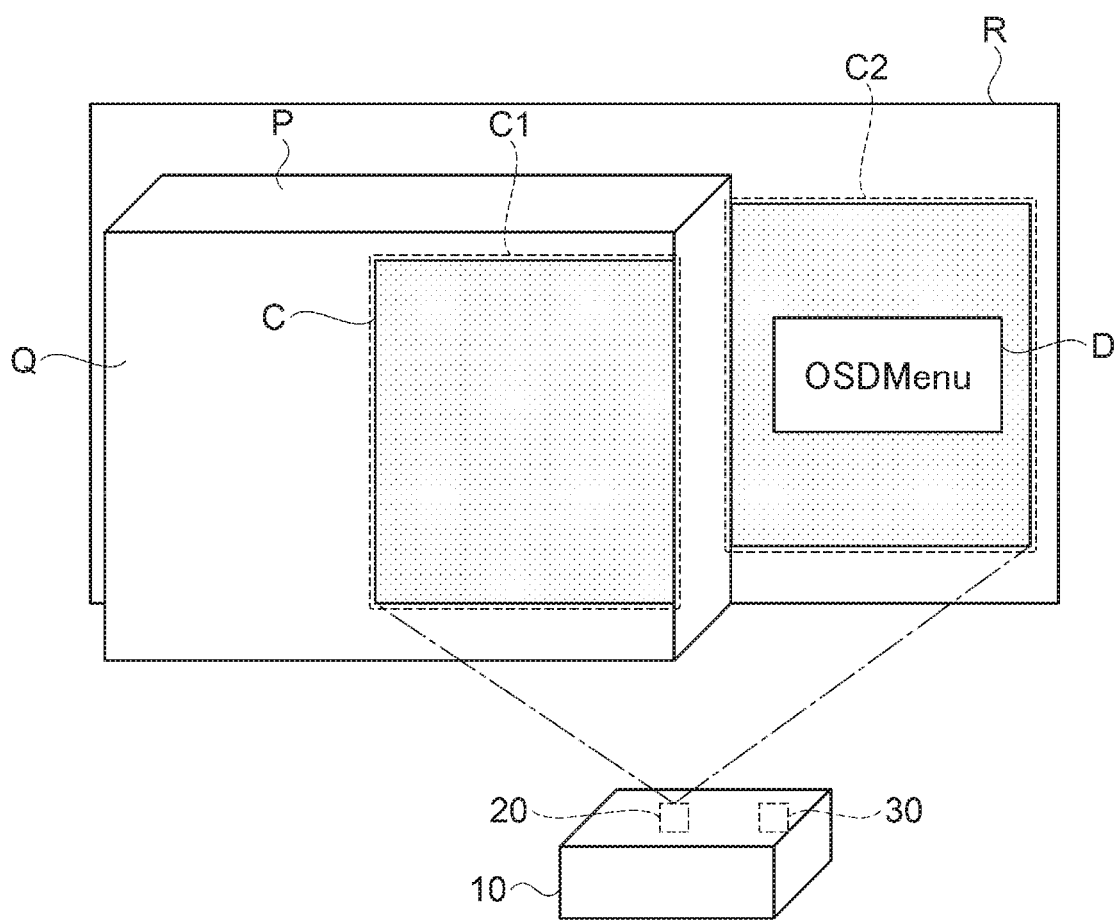
FIG. 6 is a perspective view for describing a case where a plurality of flat surfaces are present within a projection range.

For example, in the embodiment having been already described above, when not only the flat surface Q but another flat surface R is present within the projection range of the projector 10, as shown in FIG. 6, the range determiner 41 can select a flat surface on which the superimposed image D is projected. The range determiner 41 recognizes the sameness of the flat surfaces Q and R based, for example, on distortion of the sub-images F in the captured pattern image data. For each range corresponding to the recognized flat surface, the range determiner 41 detects the size, position, angle, and other factors of the flat surface. The range determiner 41 may determine as the flat surface range the range of a flat surface that provides good visibility of the superimposed image D, for example, a flat surface having the largest size. The range determiner 41 may instead determine the flat surface range by selecting one of the flat surfaces Q and R in accordance with the user's operation performed on the input instrument 50.

In the flowchart shown in FIG. 3, the processes in steps S1 and S2 may be omitted, and the process in step S3 may be the start process. In addition to the above, not only when the flat surface Q, which is the projection target, is smaller than the superimposed image D0 but when irregularities are present on a surface that is the projection target, the range determiner 41 can selectively project the superimposed image D within a range formed only of a flat surface. Deterioration of the visibility of the superimposed image D can thus be avoided.

In addition to the above, the present disclosure, of course, encompasses a variety of embodiments that are not described in the above sections, such as a configuration to which the configurations described above are mutually applied. The technical scope of the present disclosure is specified only by the inventive specific items according to the appended claims that are reasonably derived from the above description.

Contents derived from the embodiment described above will be described below as aspects.

A first aspect relates to a projector controlling method for projecting a pattern image, capturing an image of the pattern image with an image sensor to acquire captured pattern image data, determining based on the captured pattern image data a flat surface range where a flat surface is present within the range over which the pattern image is projected, generating an on-screen-display superimposed image in such a way that the superimposed image is selectively projected within the flat surface range, and projecting the superimposed image. According to the first aspect, the superimposed image can be selectively projected within the range where the flat surface is present, whereby deterioration of the visibility of the superimposed image can be avoided.

In a second aspect derived from the first aspect, the pattern image is formed of a plurality of sub-images. According to the second aspect, the flat surface range can be determined in accordance with the sub-images.

In a third aspect derived from the second aspect, whether or not the flat surface is present is evaluated based on the captured pattern image data for each of a plurality of sub-ranges corresponding to the plurality of sub-images, and when the flat surface is present in each of the sub-ranges adjacent to each other, the sub-ranges adjacent to each other are determined as the flat surface range. According to the third aspect, the accuracy of the flat surface range with respect to the actual flat surface can be improved.

In a fourth aspect derived from any of the first to third aspects, the position and size of the superimposed image are determined in accordance with the flat surface range. According to the fourth aspect, the superimposed image can be so adjusted as to be projected within the flat surface range even when at least one of the position and size of the superimposed image is not appropriate for the flat surface range.

In a fifth aspect derived from any of the first to fourth aspects, the position and size of the superimposed image are determined in such a way that the margin in the flat surface range is minimized. According to the fifth aspect, the visibility of the superimposed image can be improved by maximizing the superimposed image within the flat surface range.

In a sixth aspect derived from any of the first to fifth aspects, an initial image having an initially set position and size is projected, the image sensor captures an image of the initial image to acquire captured initial image data, and the pattern image is projected in accordance with the difference between the initial image and the captured initial image data. According to the sixth aspect, the superimposed image can be so generated that deterioration of the visibility thereof is avoided only when the visibility of the initial image deteriorates.

A seventh aspect relates to a projector including a projection instrument that project an image, an image sensor that captures an image of the projected image to generate captured image data, and a control circuit that controls the projection instrument and the image sensor. The control circuit causes the projection instrument to project a pattern image and causes the image sensor to capture an image of the pattern image to acquire captured pattern image data, determines based on the captured pattern image data a flat surface range where a flat surface is present within the range over which the pattern image is projected, generates an on-screen-display superimposed image in such a way that the superimposed image is selectively projected within the flat surface range, and causes the projection instrument to project the superimposed image. According to the seventh aspect, the superimposed image can be selectively projected within the range where the flat surface is present, whereby deterioration of the visibility of the superimposed image can be avoided.

What is claimed is:

1. A projector controlling method comprising:
   projecting a pattern image;
   capturing an image of the pattern image with an image sensor to acquire captured pattern image data;
   determining based on the captured pattern image data a flat surface range where a flat surface is present within a range over which the pattern image is projected;
   generating an on-screen-display superimposed image in such a way that the superimposed image is selectively projected within the flat surface range; and
   projecting the superimposed image; wherein
   the pattern image is formed of a plurality of sub-images; and
   whether or not the flat surface is present is evaluated based on the captured pattern image data for each of a plurality of sub-ranges corresponding to the plurality of sub-images, and when the flat surface is present in a sub-range, the sub-range is determined as the flat surface range.

2. The projector controlling method according to claim 1, wherein when the flat surface is present in each of the sub-ranges adjacent to each other, the sub-ranges adjacent to each other are determined as the flat surface range.

3. The projector controlling method according to claim 1, wherein a position and a size of the superimposed image are determined in accordance with the flat surface range.

4. The projector controlling method according to claim 1, wherein a position and a size of the superimposed image are determined in such a way that the superimposed image is maximized within the flat surface range so that a margin around the superimposed image in the flat surface range is minimized.

5. The projector controlling method according to claim 1, wherein an initial image having an initially set position and size is projected based on initial image data,
   the image sensor captures an image of the initial image to acquire captured initial image data, and
   the pattern image is projected in accordance with a difference between the initial image data and the captured initial image data.

6. A projector comprising:
   a projection instrument that projects an image;
   an image sensor that captures an image of the projected image to generate captured image data; and
   one or more processors programmed to control the projection instrument and the image sensor,
   wherein said one or more processors are programmed to cause the projection instrument to project a pattern image and to cause the image sensor to capture an image of the pattern image to acquire captured pattern image data, and are further programmed to determine based on the captured pattern image data a flat surface range where a flat surface is present within a range over which the pattern image is projected, and are further programmed to generate an on-screen-display superimposed image so that the superimposed image is selectively projected within the flat surface range, and are further programmed to cause the projection instrument to project the superimposed image; wherein the pattern image is formed of a plurality of sub-images; and whether or not the flat surface is present is evaluated based on the captured pattern image data for each of a plurality of sub-ranges corresponding to the plurality of sub-images, and when the flat surface is present in a sub-range, the sub-range is determined as the flat surface range.

7. The projector according to claim 6, wherein said one or more processors are further programmed to determine a position and a size of the superimposed image in accordance with the flat surface range.

8. The projector according to claim 6, wherein said one or more processors are further programmed to determine a position and a size of the superimposed image such that the superimposed image is maximized within the flat surface range so that a margin around the superimposed image in the flat surface range is minimized.

9. The projector according to claim 6, wherein said one or more processors are further programmed to project an initial image having an initially set position and size based on initial image data, the image sensor captures an image of the initial image to acquire captured initial image data, and said one or more processors are further programmed to project the pattern image in accordance with a difference between the initial image data and the captured initial image data.

\* \* \* \* \*